US010048396B2

(12) United States Patent
Dobin et al.

(10) Patent No.: US 10,048,396 B2
(45) Date of Patent: Aug. 14, 2018

(54) METHOD FOR REGION DELINEATION AND OPTIMAL RENDERING TRANSFORM OF SEISMIC ATTRIBUTES

(71) Applicants: Mark Dobin, The Woodlands, TX (US); Yao-chou Cheng, Houston, TX (US); Patricia Montoya, The Woodlands, TX (US)

(72) Inventors: Mark Dobin, The Woodlands, TX (US); Yao-chou Cheng, Houston, TX (US); Patricia Montoya, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1116 days.

(21) Appl. No.: 14/181,277

(22) Filed: Feb. 14, 2014

(65) Prior Publication Data

US 2014/0278117 A1     Sep. 18, 2014

Related U.S. Application Data

(60) Provisional application No. 61/783,185, filed on Mar. 14, 2013.

(51) Int. Cl.
   *G01V 1/34*     (2006.01)
(52) U.S. Cl.
   CPC .......... *G01V 1/345* (2013.01); *G01V 2210/64* (2013.01)
(58) Field of Classification Search
   CPC . G01V 1/28; G01V 1/301; G01V 1/30; G01V 1/345; G01V 2210/64; G01V 2210/74; G01V 99/005; G06T 15/08; G06T 17/05; E21B 49/00

USPC ............ 702/11, 14, 16; 703/10; 367/21
See application file for complete search history.

(56) References Cited

U.S. PATENT DOCUMENTS

| | | | |
|---|---|---|---|
| 5,838,634 A | | 11/1998 | Jones et al. |
| 5,995,448 A | * | 11/1999 | Krehbiel .......... G01V 1/28 367/68 |
| 6,377,908 B1 | | 4/2002 | Ostrowski et al. |
| 6,549,879 B1 | | 4/2003 | Cullick et al. |

(Continued)

FOREIGN PATENT DOCUMENTS

| | | |
|---|---|---|
| EP | 1 696 247 | 1/2001 |
| WO | 2008/154640 | 12/2008 |

(Continued)

OTHER PUBLICATIONS

Smith, Thomas "Volumetric Curvature: The Next Step in Seismic Attributes", www.geoexpro.com, May 2008.

(Continued)

*Primary Examiner* — Roy Y Yi
*Assistant Examiner* — Jeffrey Aiello
(74) *Attorney, Agent, or Firm* — ExxonMobil Upstream Research Company-Law Department

(57) ABSTRACT

Method for determining visualization rendering parameters for seismic data to heighten subtle differences. The full data volume and at least one sub-volume are processed in the inventive method (12). Statistics are extracted for the data or attributes of the data (13). Rendering parameters are derived based on comparing and computing the statistical information for the volume and sub-volumes (14).

12 Claims, 10 Drawing Sheets
(8 of 10 Drawing Sheet(s) Filed in Color)

(56) References Cited

U.S. PATENT DOCUMENTS

| | | | |
|---|---|---|---|
| 6,594,585 B1* | 7/2003 | Gersztenkorn | G01V 1/30 |
| | | | 702/14 |
| 6,757,613 B2 | 6/2004 | Chapman et al. | |
| 7,200,540 B2 | 4/2007 | Colvin et al. | |
| 7,460,957 B2 | 12/2008 | Prange et al. | |
| 7,463,552 B1* | 12/2008 | Padgett | G01V 1/288 |
| | | | 367/38 |
| 7,953,587 B2 | 5/2011 | Bratton et al. | |
| 8,073,664 B2 | 12/2011 | Schottle et al. | |
| 2004/0210395 A1* | 10/2004 | Cheng | G01V 1/28 |
| | | | 702/14 |
| 2004/0260471 A1* | 12/2004 | McDermott | G01V 7/00 |
| | | | 702/2 |
| 2007/0199721 A1 | 8/2007 | Givens et al. | |
| 2009/0238041 A1* | 9/2009 | Levin | G01V 1/364 |
| | | | 367/40 |
| 2010/0171740 A1 | 7/2010 | Andersen et al. | |
| 2010/0191516 A1 | 7/2010 | Benish et al. | |
| 2011/0295510 A1* | 12/2011 | Gulati | G01V 1/28 |
| | | | 702/16 |
| 2011/0297369 A1* | 12/2011 | Kumaran | G01V 1/288 |
| | | | 166/250.01 |
| 2012/0090834 A1* | 4/2012 | Imhof | G01V 1/32 |
| | | | 166/250.01 |
| 2013/0286782 A1* | 10/2013 | Vyas | G01V 1/282 |
| | | | 367/73 |
| 2013/0338927 A1* | 12/2013 | Kumaran | G01V 1/30 |
| | | | 702/14 |
| 2014/0185413 A1* | 7/2014 | Aarre | G01V 1/301 |
| | | | 367/53 |

FOREIGN PATENT DOCUMENTS

| | | |
|---|---|---|
| WO | 2009/032416 | 3/2009 |
| WO | 2011/149609 | 12/2011 |

OTHER PUBLICATIONS

Chopral, S., et al.,(2005), "75$^{th}$ Anniversary Seismic Attributes—A Historical Perspective", Geophysics, v70, No. 5, pp. 3SO-28SO.

Banchs, R., et al.(2002), "Content Addressable Memories for Seismic Attribute Pattern Recognition", EAGE 64$^{th}$ Conference & Exhibition—Florence, Italy, May 27-30, 2002.

* cited by examiner

METHOD FOR REGION DELINEATION AND OPTIMAL RENDERING TRANSFORM OF SEISMIC ATTRIBUTES

CROSS-REFERENCE TO RELATED APPLICATION

This application claims the benefit of U.S. Provisional Patent Application 61/783,185 filed Mar. 14, 2013 entitled METHOD FOR REGION DELINEATION AND OPTIMAL RENDERING TRANSFORM OF SEISMIC ATTRIBUTES, the entirety of which is incorporated by references herein.

FIELD OF THE INVENTION

The present disclosure relates to the field of geophysical prospecting and, more particularly, to seismic data processing. Specifically, the disclosure concerns a system and method for determining transformation parameters and mappings of transfer functions for data visualization and interpretation, by computing statistics extracted from selected seismic attributes and comparing them between the entire data volume and one or more sub-regions of it.

BACKGROUND

Seismic Attribute Analysis technologies are having a significant impact on upstream geoscience activities in oil exploration. Visualization and analysis of seismic attribute volumes in a 3D earth model in an interactive setting can significantly improve geological object detection, including subtle feature identification. One of the tasks and challenges in these environments is to be able to effectively and efficiently analyze and visualize the data volume to aid the discovery and analysis of geological objects and their related rock and fluid properties.

The study of seismic attributes provides qualitative information of the geometry (such as lateral continuity, depositional pattern) and physical parameters (such as impedance, reflection coefficients) of the subsurface. A number of attributes are typically derived from a data set to represent or extract a certain physical property. For example, a set of attributes, such as amplitude maximum, minimum, interval amplitudes, and directions, are used to enhance the information that might be subtle in original seismic data. Others such as diffusion, spectral decomposition, and discontinuity data cube could be used for fault or horizon detection purposes.

Lees, J., et al. in EP 1696247, "System And Method for Analyzing and Imaging an Enhanced Three-Dimensional Volume Data Set Using One or More Attributes," describe a process for creating a combination attribute volume or combo volume by combining one or more attribute volumes into a single volume. The resulting combined volume may then be displayed and a seed pick positioned on an event of interest such as a geological body. An auto-picker function will then find all the connecting points.

Andersen, J., et al. in their patent publication US 2010/0171740, "Visualizing Region Growing in Three Dimensional Voxel Volumes" disclose a process that may be summarized as generating a 3D scene having a plurality of voxels for representing a volume data set of seismic data collected from the oilfield, defining a segmentation algorithm for segmenting the volume data within the 3D scene, the segmentation algorithm comparing a pre-determined threshold to an attribute of a voxel for a plurality of voxels, defining a control parameter associated with the attribute for controlling the segmentation algorithm, adjusting the control parameter to guide the segmentation algorithm in segmenting the volume data set to generate a visualized geobody, and displaying the visualized geobody.

Andersen, J., et al. in their paper "Delineation of Geological Elements from RGB Color Blending Seismic Attributes Volumes" describe a widely used multi-attribute visualization technique based on color blending. In this technique, data samples are mapped based on a three dimensional color space, namely red, blue and green components, based on three corresponding seismic attributes.

In U.S. Pat. No. 5,838,634 to Jones et al. ("Method Of Generating 3-D Geologic Models Incorporating Geologic And Geophysical Constraints"), features of subsurface earth reservoirs of interest are made available for analysis and evaluation by forming three-dimensional, geologic block models based on field data. The field data include geological observations, such as lithofacies and porosity values obtained from well data and other sources, as well as geophysical data, usually from seismic surveys. The geologic models representative of subsurface reservoirs so obtained are optimized to match as closely as feasible geologic constraints known or derived from observed geologic data. The models also conform to geophysical based constraints indicated by seismic survey data. The modeled geologic lithofacies and porosity are converted into acoustic velocity and bulk density values, which are then formulated as a seismic response which is then compared with actual seismic data. A perturbation process on lithofacies and porosity can be iteratively repeated until a representation of the reservoir is obtained which is within specified limits of accuracy or acceptability.

Washbourne et al. in their patent application publication WO 2008/154640, "Optimizing Amplitude Inversion Utilizing Statistical Comparisons of Seismic to Well Control Data," describe a method for obtaining enhanced seismic data and optimized inverted reflectivity, which includes computing statistical well characterizations based upon band-limited well reflectivity for a subsurface region. The seismic data are inverted using an optimal seismic inversion algorithm to produce a set of optimized inverted reflectivity.

Imhof, et al. in their patent application publication WO 2011/49609, "Method for Seismic Hydrocarbon System Analysis," propose a method for analyzing seismic data representing a subsurface region for presence of a hydrocarbon system or a particular play. Seismic attributes are computed, the attributes being selected to relate to the classical elements of a hydrocarbon system, namely reservoir, seal, trap, source, maturation, and migration.

Pascal Klein et al. in their paper "3D Curvature Attributes: A New Approach for Seismic Interpretation," disclose a method to compute volumetric curvatures and their application to structural closure and qualitative estimation of basic fracture parameters. Their method allows the quantification and qualification of lateral continuity of the fault and its vertical displacement.

Chopra and Marfurt in their paper "75th Anniversary Seismic attributes—A Historical Perspective" (*Geophysics* 70, pages 3SO-28SO (September-October 2005); describe the historical view of seismic attributes and their development. The creation, processing and visualization of seismic attributes have contributed to the reflector acquisition, mapping, fault identification, bright spot identification, among other things. Techniques such as clustering, self-organized maps, geostatistics, and neural nets have extended their capabilities.

R. Banchs and J. Jimenez in their paper "Content Addressable Memories for Seismic Attribute Pattern Recognition," EAGE 64th Conference & Exhibition—Florence, Italy (May 27-30, 2002) describe a seismic attribute pattern recognition method based on content addressable memories for the purpose of reservoir characterization. The method allows the classification of seismic facies/class maps in which each of the classes is related to a predefined reference location.

In publications such as those described above, computational techniques such as discrimination analysis, geostatistics, supervised training, unsupervised classification and calibrations are used for analyzing or interpreting various seismic attributes. Furthermore, multiple volume blending and co-rendering of seismic attributes has also been used extensively in an interactive interpretation environment for visualizing and delineation of regions of interest. The term co-rendering means to display at least two data volumes for viewing, typically on a computer monitor or similar output display device.

The combination of computational methods and multi-dimensional transfer functions of opacity control and color mapping has been used to highlight, display and classify areas of interest, reveal channel structure, identify stratigraphic features as well as classify facies boundaries. However, due to the complexity and inter-dependence of multi-dimensional attributes, optimal rendering using current techniques requires extensive data knowledge and visualization experience to optimally manipulate parameters and calibrations to extract key geological insights from these data. For novice and even experienced users, these activities are time-consuming tasks and can result in errors and possibly lost opportunities due to sub optimal parameter selection.

SUMMARY

In one embodiment, the invention is a method for determining rendering parameters, including mappings of transfer functions, for visualization and interpretation of all or part of a data volume of seismic or seismic attribute data representing a subsurface region, said method comprising: (a) selecting a sub-volume from the data volume, said sub-volume representing a sub-region of the subsurface region; (b) selecting a statistical measure; (c) computing, using a programmed computer, a corresponding statistical distribution for both the data volume and the sub-volume, based on the selected statistical measure; and (d) deriving rendering parameters for the sub-volume by comparing the computed statistical distribution for the sub-volume to that of the data volume, noting at least one difference, and constructing rendering parameters to emphasize the at least one difference.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

In those jurisdictions that do not allow the use of color, black and white reproductions of the color drawings will be substituted.

Figure 1:
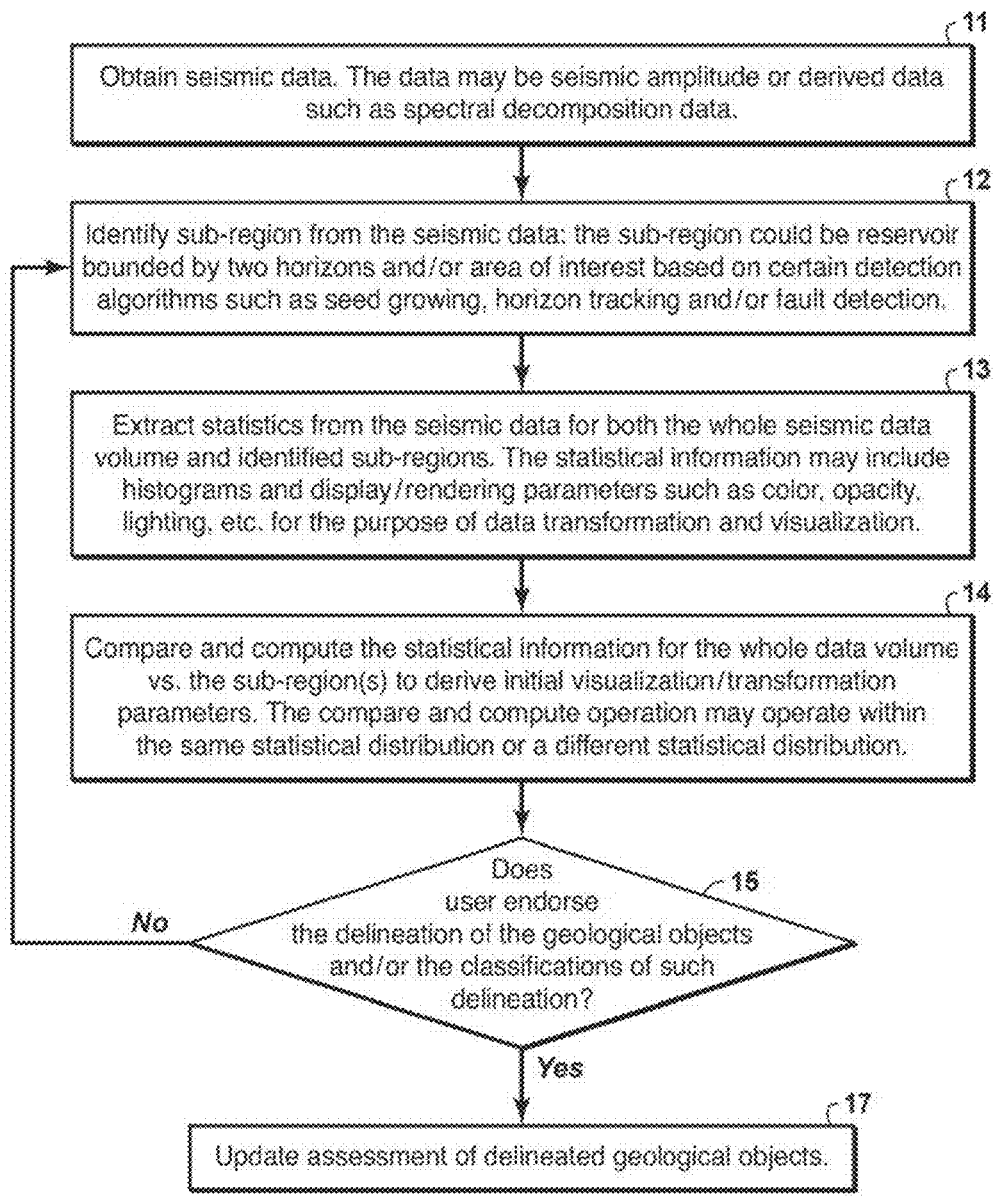
Figure 2:
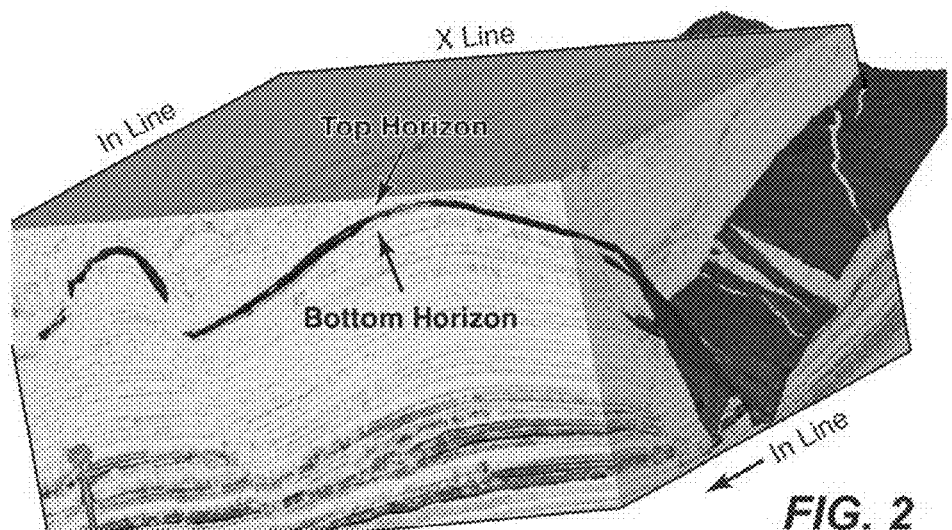
Figure 3:
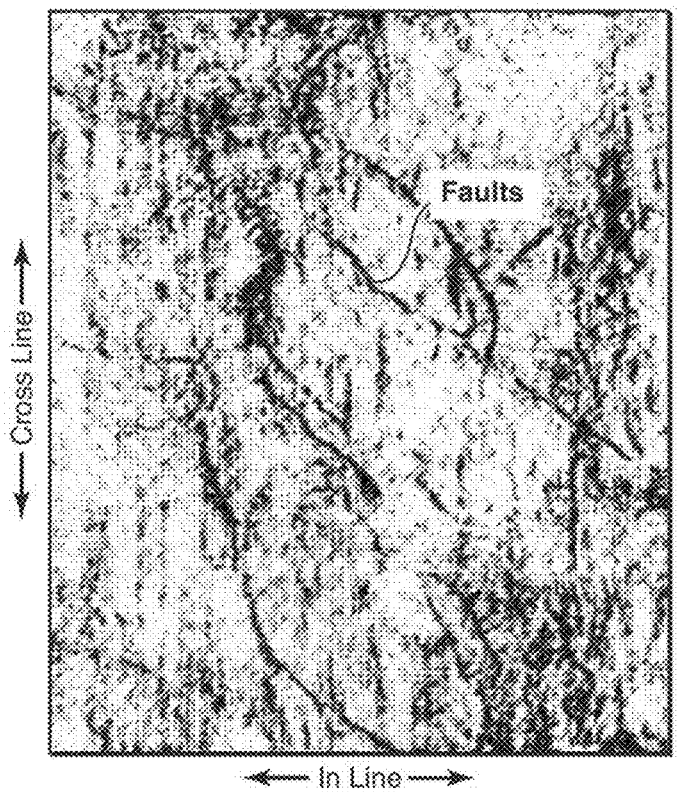
Figure 4:
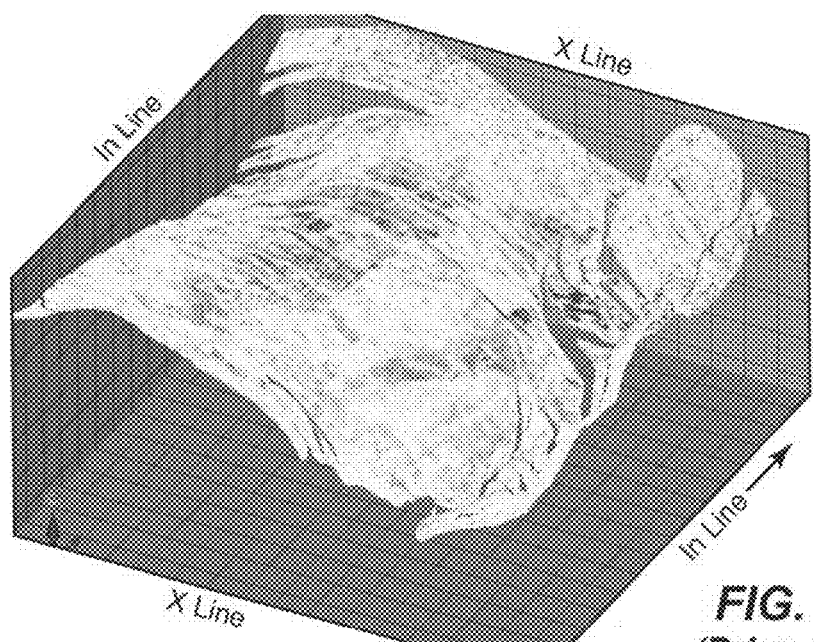
Figure 5:
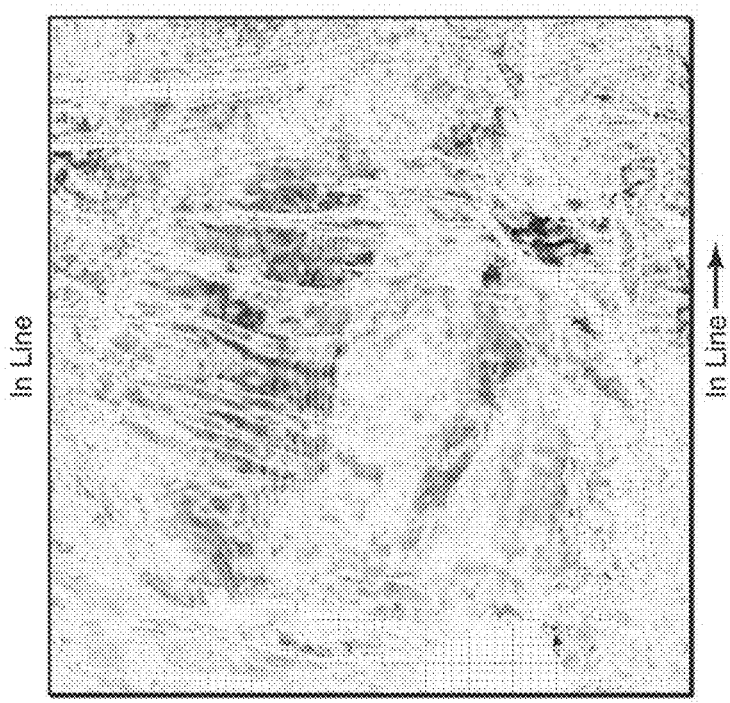
Figure 6A:
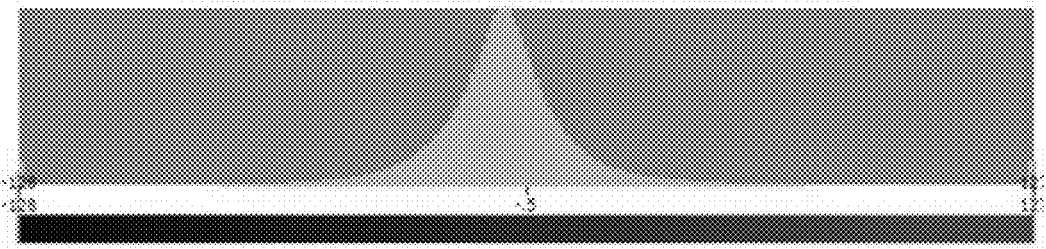
Figure 6B:
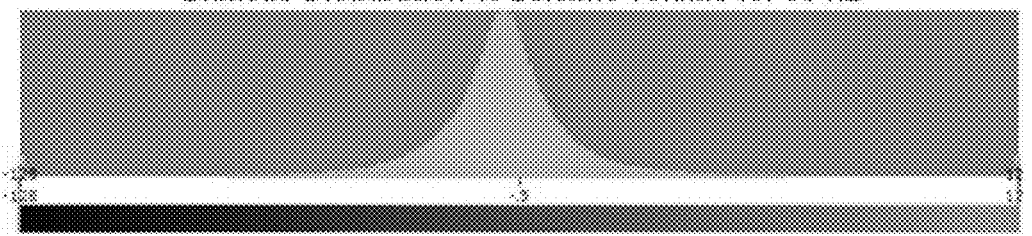
Figure 6C:
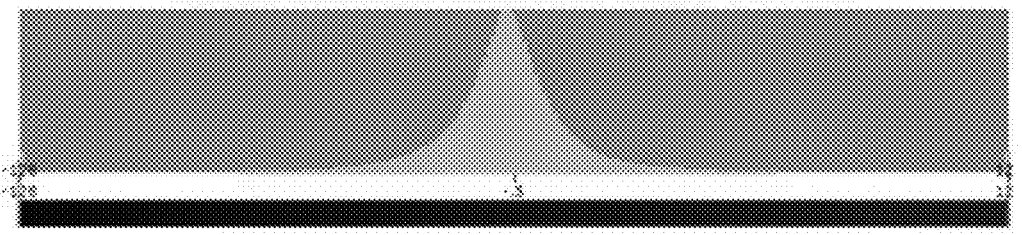
Figure 7:
Figure 8A:
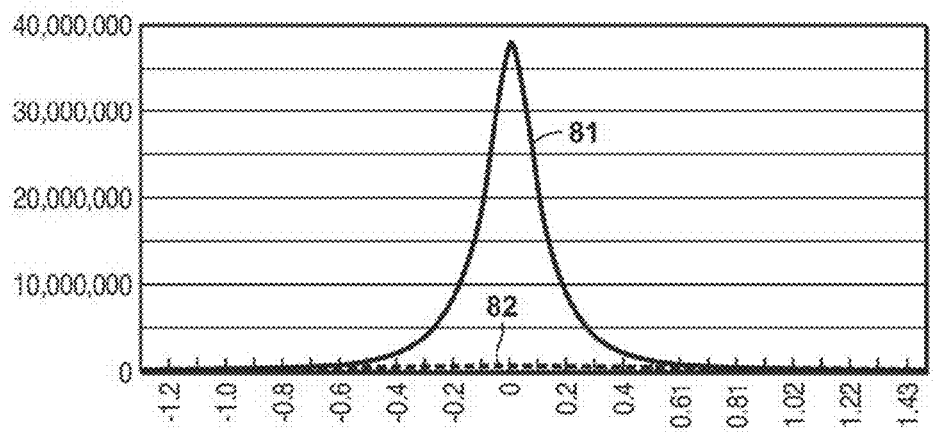
Figure 8B:
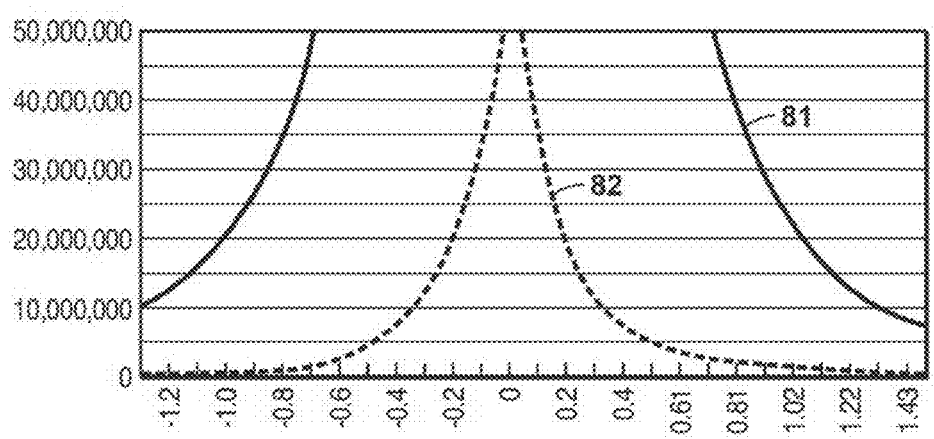
Figure 8C:
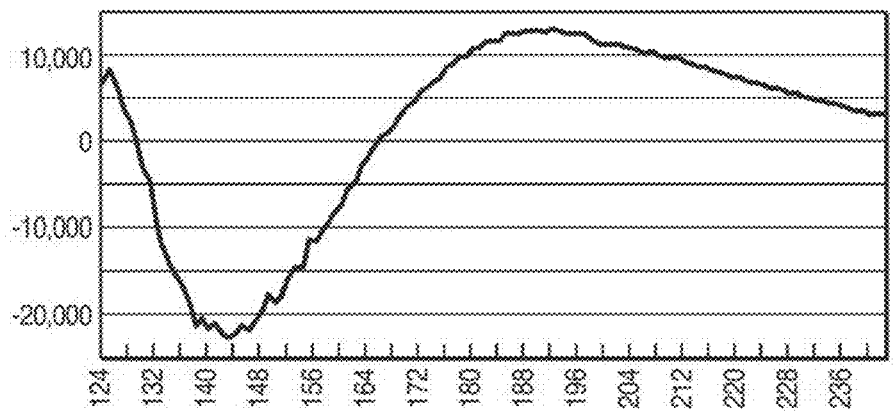
Figure 9A:
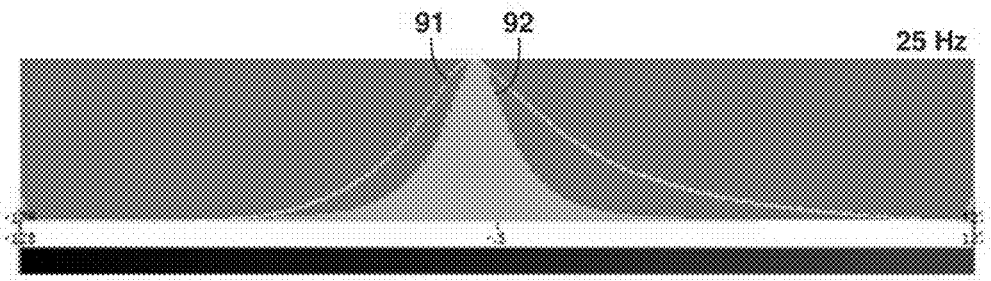
Figure 9B:
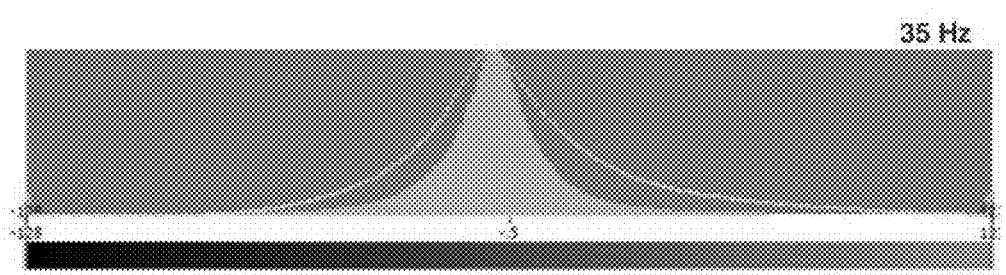
Figure 9C:
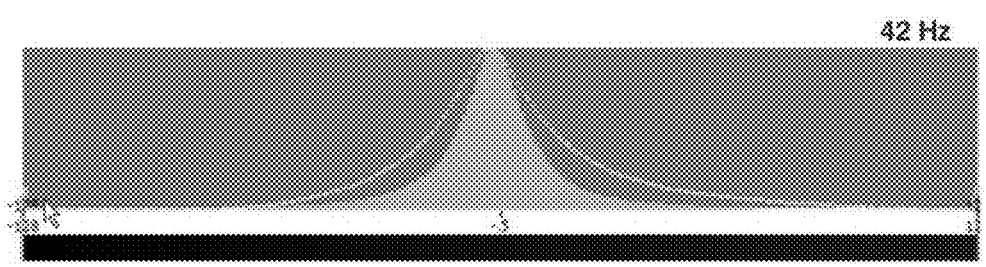
Figure 10A:
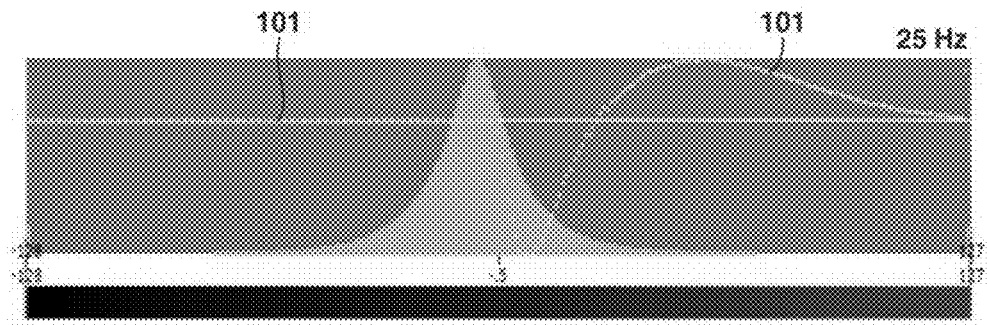
Figure 10B:
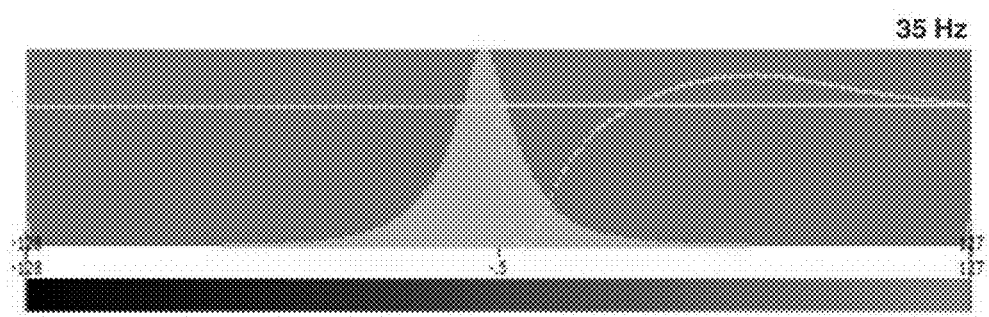
Figure 10C:
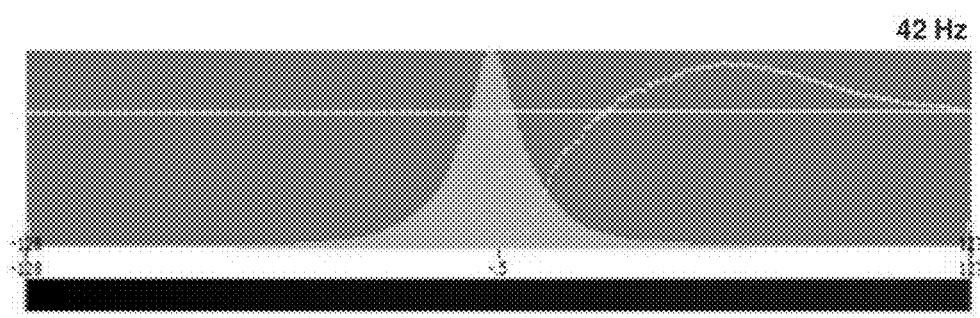
Figure 11A:
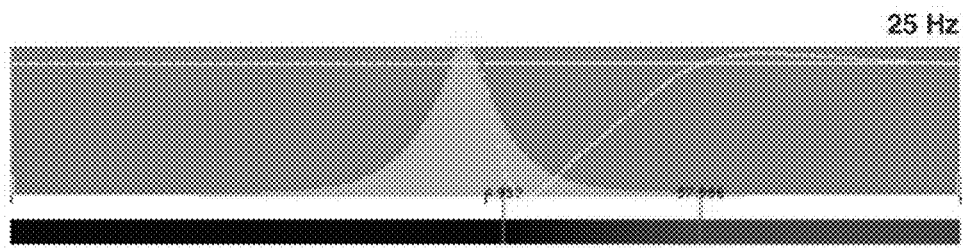
Figure 11B:
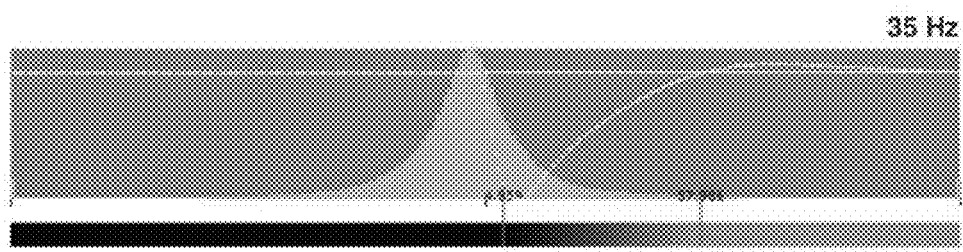
Figure 11C:
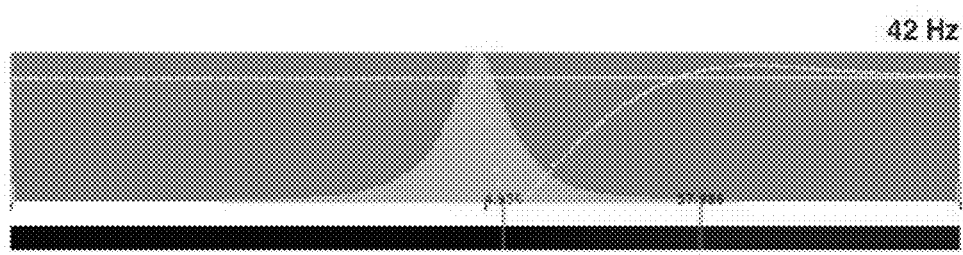
Figure 11D:
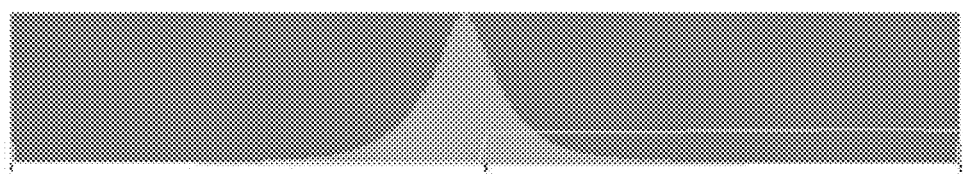
Figure 12:

The advantages of the present invention are better understood by referring to the following detailed description and the attached drawings, in which:

FIG. 1 is a flowchart showing basic steps in one embodiment of the present inventive method for determining transformation parameters and mappings of transfer functions by calibrating and comparing their respective region/sub region distributions of seismic attributes;

FIG. 2 is a data display of a seismic volume with two horizons;

FIG. 3 displays a data volume of a seismic attribute measuring discontinuity, shown with a time slice;

FIG. 4 is a seismic data display of part of the data volume of FIG. 2, showing a sub-region bounded by two horizons;

FIG. 5 shows a top view of the seismic sub-region of FIG. 4;

FIGS. 6A-6C show statistical distributions of the seismic volume of FIG. 2 for frequencies of 25 Hz, 35 Hz, and 42 Hz, respectively;

FIG. 7 shows a blended image for the defined sub-region of FIG. 4, where the image is obtained using the standard default visualization/transformation parameters;

FIGS. 8A-8C show comparisons and operations of region/sub-region statistics, wherein 8A is a histogram distribution for both the entire data set and a selected sub region; 8B shows the same statistical measure as in 8A, with normalization of the two histograms; and 8C shows the results of performing a subtraction operation on the normalized statistics of 8B;

FIGS. 9A-9C show (dotted line curve) the statistical distribution of the seismic sub-region for, respectively, 25 Hz, 35 Hz, and 42 Hz;

FIGS. 10A-10C show results of the operations on the sub-region statistical distribution of the three seismic data volumes (25 Hz, 35 Hz, and 42 Hz), wherein anomalous regions in the graphs are now enhanced, making them easier to identify;

FIGS. 11A-11C show the color mapping functions adjusted based on the identified mapping parameters derived from the sub-region statistical distributions, and FIG. 11D shows an opacity curve; and FIG. 12 shows subtle geological features now clearly identified from the newly blended images, particularly at the center of the display, and the lower left where channel complexes are revealed.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, the method must be performed on a computer programmed in accordance with the teachings herein.

DETAILED DESCRIPTION

A method is disclosed to determine transformation parameters and mappings of transfer functions by calibrating and comparing their respective region/sub-region distributions of seismic attributes (FIG. 1). Alternate terminology is used at times in this document to refer to these parameters and transfer functions to reflect varying terminology in the technical field. Such alternate expressions include "visualization/transformation parameters," and "rendering parameters" which includes mappings of transfer functions.

In one example embodiment shown in FIG. 2, a user creates and/or obtains a three-dimensional shared earth model including seismic data, a geological model, a reservoir model as well as geological interpretations such as faults and horizons. One or more derivative seismic attributes data sets also need to be included in the input for the present inventive method.

Seismic attributes are quantitative measures of various seismic characteristics. They are quantities computed from the measured seismic amplitude data. The signals from the measurements, for example, seismic amplitude, could allow geoscientists to interpret/display the reflection strength, frequency, phase that ties to hydrocarbon fluid. But, typically, seismic attributes can be derived by computing processes/algorithms from diverse data sources which allows geoscientists to relate and interpret their relationships to certain geologic and reservoir characteristics.

One example of a seismic attribute data volume, called a discontinuity volume, is shown in FIG. 3. The discontinuity attribute volume can be derived from the seismic amplitude volume by mathematic formulations, such as cross-correlations, applied to the adjacent seismic traces in various directions. The calculations would enhance the discontinuity signatures along the stratigraphy layers which would then help geoscientists in interpreting or identifying the subsurface structure or stratigraphic elements. Referring to FIG. 3, a time slice shows the data as gray-scale images. The darker color represents higher discontinuity in the nearby area, which enhances the structural and stratigraphic features.

Other filtering techniques that create various derived data attributes by scanning the entire volumes may also be used. These methods typically use a defined sized data window (for example, a 5×5×5 box with the sample in the center location) and a defined mathematical process (such as median, mean, principle components and/or texture descriptors) to calculate a set of new values from the data values within the window.

In the field of seismic attribute analysis and visualization of seismic data volume, statistics and transfer functions are widely used. Statistical analysis is a field for the purpose of collection, interpretation, understanding and presentation of a data. Traditionally, histograms of a single seismic attribute, or co-histograms of multiple attributes are used for the purpose of highlighting, delineating the seismic volumes in an interactive seismic interpretation workstation. In a broad sense, the results of statistical analysis would form the bases for further processing such as clustering, pattern analysis, as well as other discriminate analysis for the purpose of delineation or detection of geological objects from the given seismic attributes.

Visualization of seismic data and geological objects, such as horizons, in a three-dimensional shared earth model is essential in the seismic interpretation processes. A seismic amplitude data volume and two interpreted horizons are shown in FIG. 2. In this example seismic amplitudes are represented as a regular three-dimensional data grid. Each cell in the location (X, Y, Z) contains representative amplitude response in the (X, Y) location that represents some sort of mid-point between the locations of the source and receiver that correspond to the amplitude response. The Z axis could represent either depth or time in the subsurface earth space.

In FIG. 2, the data volume displayed is based on the transfer function that maps the domain of amplitude range to a color spectrum. Example of such a color spectrum could be: blue color for the negative high amplitude data sample, red color for positive amplitude and white color for zero crossing of the amplitude value. All other data sample would be defined by certain color interpolation algorithms that blend the mixture of colors based on the value in between accordingly. Color of each data sample can then be rendered based on the mapped color from its amplitude value. The purpose of the rendering processing for the entire data volume is to project/blend the colors to a two-dimensional display window according to the viewing trajectory. In the example shown in FIG. 2, all cells in the data grid are displayed in full opacity so that only the sample data exposed in the viewing direction are shown. The two horizons that extend outside the boundary of the seismic data are also shown.

The design of transfer functions mostly rely on the result of statistics of the data set. Transfer functions work similar to a look-up table that maps each data sample based on data value to a specific color and/or opacity. For example, a data sample with the closely related data value could be displayed as the same color if they represent similar physical property. In other words, two nearby data samples with close data values would display similar colors if they represent similar physical properties (i.e., if they belong to the same depositional geobody). The opacity display for each sample could also be rendered based on the given transfer function in order to hide or show selected data samples in the entire volume. (Opacity cannot be seen from, for example, FIG. 2. See the discussion of FIG. 11A later in this document.) Data samples may be transparent or semi-transparent if their corresponding opacity values in the transfer function are near zero. By manipulating transfer functions, the rendering of entire seismic volumes that show regions of interest may be done interactively using a commodity workstation equipped with a high-end graphic processing unit (GPU). This process then allows geoscientists to delineate and classify regions of seismic data volumes in order to identify specific features in the data.

FIG. 1 is a flowchart showing basic steps in one embodiment of the present inventive method. In step 11, one or more seismic data sets representing the same subsurface region are obtained; for example, there may be two seismic data volumes, which are two different attributes derived from a seismic survey data set, e.g. a frequency volume. Thus, the data could be seismic amplitude or derived (attribute) data such as spectral frequency decomposition data in a 3-D virtualization environment, or both. For purposes of this document, the terms seismic data volume and (seismic data) attribute volume will be deemed interchangeable unless the context indicates otherwise.

In step 12, at least one sub region is identified from the seismic data volume(s). Examples of sub regions could include a reservoir area bounded by two horizons, a slab of data area based on certain range of times (in a time domain data set) or depths (in a depth domain data set), or the area of interest based on certain detection algorithm such as seed growing, horizon tracking and/or fault detection. In principle, an entire data volume could be a single sub region, although this would be inefficient.

FIG. 4 shows a seismic display for a sub region representing a reservoir unit that is defined by two horizons. In this display, the opacity value of the data sample is set to be 1 (totally opaque) for the entire data sample in between the two given horizons and 0 otherwise. This way, the geoscientist can focus his or her attention on identifying the subtle features in the reservoir. Several fault units are clearly shown with less obvious channel-like geometries in the middle of the area. FIG. 5 shows the same display area but viewed from the top of the reservoir. Unfortunately, the design of the transfer function in this example does not effectively delineate/render the subtle features of the channel complexes. In order to accentuate those features, the user traditionally will manually experiment with different color and opacity mappings or various transfer functions. The end result of this time consuming process could still be suboptimal interpretations, usability and cognitive and physical ergonomics.

In step 13 of FIG. 1, selected statistics of the seismic data volume are computed or extracted from each data set selected in step 11. Data areas to be used on these calculations would include the one or more sub regions identified in step 12, and the whole data volume (for reference). The statistical results could include histograms and display/rendering parameters such as color, opacity, lighting, etc. for the purpose of data transformation and visualization.

The statistical analysis of step 13 would also apply to data volumes for multiple attributes obtained from a process called spectral decomposition. Seismic spectral decomposition refers to methods that utilize time-frequency analysis of seismic traces. The result of the analysis would produce a frequency spectrum for each sample of seismic trace. Discrete Fourier Transform, Continuous Wavelet Transform and Matching Pursuit Decomposition are some of the widely used methods.

Typically, the process of seismic spectrum decomposition that applies to a seismic amplitude data volume would output a set of amplitude data at discrete frequencies. Three spectral frequency seismic data volumes at frequency of 25 Hz, 35 Hz and 42 Hz are used here to describe one example embodiment of the invention. In other words, in this embodiment of the invention, these particular three frequency components are the data attributes selected, and their amplitude distributions are the statistics extracted from them. For each spectrum data volume, a statistical distribution is obtained for the entire volume. The histograms show close to normal distributions as shown in cyan color in FIGS. 6A-6C. (Where patent law restrictions on the use of color apply, these drawings and others that were originally in color are presented herein as black-and-white reproductions of colored originals.) In each of FIGS. 6A-6C (and in FIGS. 9A-9C, 10A-10C, and 11A-11D as well), seismic amplitude is plotted on the horizontal axis ranging from −128 to +127. FIGS. 6A-6C illustrate certain statistics associated with three different frequency components of the data volume.

In this example, a blending operation, called Direct RGBA blending, is used to render the seismic data volumes. (See, for example, "Delineation of geological elements from RGB color blending of seismic attribute volumes," The Leading Edge 27, 342 (2008)) As shown in FIGS. 6A-6C, a red spectrum color function is used for the 25 Hz volume, a green color function is used for the 35 Hz volume and a blue color function is used for the 42 Hz volume. (As stated previously, the colors will not be seen in those jurisdictions where patent law restrictions force the use of black and white reproductions.) The Direct RGBA blending method is a color blending model that incorporates the data of each of three primary color spaces: red, green, and blue. They are mixed as a direct color scheme from each of the data sets. That is, the final color of a given cell in seismic data space is determined by the mixture of red, green and blue intensities in their corresponding seismic attributes volumes. In this example, darker red, green and blue are corresponding to the negative amplitude in the 25 Hz data volume, the 35 Hz volume and the 45 Hz volume respectively; the rest of color assignment for each of the transfer functions would then linearly assign lighter colors as the amplitude value increases.

FIG. 7 shows such a blended image for the same sub region defined earlier in FIG. 4, using Direct RGBA blending of the three spectrum attribute data volumes. Thus, FIG. 7 shows the blended image obtained by using the standard default transformation parameters shown in FIGS. 6A-6C. That is, the color spectra that are used in the transfer functions for all three data volumes are uniformly distributed. Compare to the original seismic amplitude display, the Direct RGBA blending tends to produce a more colorful display that is more accessible to human perception. On the other hand, the subtle geological features may still not be readily detected in FIG. 7. To enhance the rendered image and improve the detection of the geological/stratigraphic features, users of an interactive interpretation system may use different transfer functions, opacity mappings and adjust various display parameters. However, this process may prove to be ineffective and tedious due to the large number of rendering parameters to be adjusted.

Other techniques to manipulate the transfer function, such as using the CMY color model instead of the RGB color model for each of the selected components, may prove to be useful in some seismic data set but results could vary depending upon the seismic attribute in certain sub-regions of the data.

Step 14 in FIG. 1 describes an embodiment of the invention in which the statistical information based on the sub region definition are compared and computed. The compare and compute operation may take place within the same statistical distribution or may span different statistical distributions. This step may be thought of as a comparison step where the comparison is quantified by a computing step, which may be a normalization or calibration of one statistical distribution to another. Examples of these operations may include subtracting (differencing) the positive with the negative polarity data distributions of the seismic data volume, or comparing normalized distributions of a sub region vs. the entire data set.

Referring to FIGS. 8A-8C, an example of a statistical analysis and a compare-and-compute operation of the present invention are illustrated; i.e. this is an example of step 14 of FIG. 1. Two regions of a seismic attribute data volume are considered here; one is the full data volume and the other is a selected sub region of the data volume. Each region's statistics are calculated, i.e. a selected statistical measure is applied to each region, generating histogram distributions, i.e. frequency of occurrence of each amplitude value. FIG. 8A plots the histograms of both distributions displayed in the same scale. The blue line 81 shows the statistical distribution of the entire data volume (the same data volume used to generate FIGS. 6A-6C) and the pink line 82 shows the statistical distribution of a sub region between the given two horizons. By normalizing both distributions to the same peak value, we can see from FIG. 8B that the two regions have distinct distributions. In this example, the selected statistical measure looks at the seismic amplitude and the distribution of positive and negative amplitude values, and this distribution is clearly different for the data in the reservoir sub region compared to the entire data volume. To facilitate the visualization of this difference, a subtraction operation for each corresponding amplitude value is applied to the distribution curve, i.e. the normalized distributions of FIG. 8B are differenced. Then for each sub region's statistical distribution, an operation is imposed; the operation used here is to compare the positive amplitude to the negative amplitude and compute the absolute value of the ratio. The generated curve is shown in FIG. 8C. This curve would give the user various default ranges of the amplitudes; for example, see the discussion of FIG. 11A below.

Referring back to the traditional example of Direct RGBA blending method for the spectrum decomposition attributes, the same approach described earlier is then applied to each one of the statistical distributions. The results of this normalization operation are shown as pink lines in FIGS. 9A-9C. In other words, the pink curves or histograms in FIGS. 9A-9C are the frequency decomposed spectral components of the normalized pink histogram 82 in FIG. 8B, for the frequencies 25 Hz, 35 Hz, and 42 Hz, respectively. The pink curves 91 represent the sub-region. The blue curves 92 represent the full data volume, and are the same as the blue curves in FIGS. 6A-6C. Both distributions are normalized as shown in the display panels. The new distribution mapping shows that the sub region has abnormal (i.e., not symmetric) distributions, closed to the positive side of data. In other words, FIGS. 9A-9C show that for each of the three frequency components, the sub region distribution shows a slight asymmetry around the zero crossing. In contrast, the distributions for the full data volume are symmetric.

As another example of step 14 of the present inventive method, FIGS. 10A-10C show the results 101 of a subtraction operation that compares the positive data trend to the negative data trend in the sub region statistical distributions of FIGS. 9A-9C. This enhances anomalous regions in the graphs making them easier to identify for the user.

The setting of visualization parameters based upon the distribution of the data and the subtraction operation described above may be automated, i.e. programmed and run on a computer, as follows:

1. Extract a normalized trend curve for the data set, e.g. 81 in FIG. 8A.
2. Normalize a subregion histogram to the max population; e.g., in FIG. 8B, normalize curve 81 to curve 82.
3. Subtract normalized trend curve from normalized subregion histogram; e.g., FIG. 8C.
4. For half peak set color table and rendering based upon the following:
   a. Set zero saturation (black) to min value
   b. Set max saturation (vol 1=red, vol 2=blue, vol 3=green) at zero crossing. If for peak the 1st zero crossing to left of min value and if trough the 1st zero crossing to right of min value; e.g. FIG. 11A.
5. Display difference curve in parameter editing.

A background reference for such an automation is Sereda, et al., "Automating Transfer Function Design for Volume Rendering Using Hierarchical Clustering of Material Boundaries," submitted/presented in Eurographics/IEEE-VGTC Symposium on Visualization (2006).

Finally, the transform parameters are determined based on the compare-and-compute operation (step 14) of the present invention that was performed on the calculated distribution functions. The color mappings for the blending operation are then adjusted based upon the operated sub region statistics accordingly. Notice that in FIGS. 11A-11C, the spectra of RGB color functions has been redefined. In FIGS. 10A-10C, the color bars vary across the entire range of the data. In FIGS. 11A-11C, the ranges of variation have been more optimally placed using the automated process described above. The narrow ranges of the mapping are focused on the positive amplitudes near the center of the distributions.

FIG. 11D shows an opacity curve which, in addition to the color look-up table giving the mapping of a seismic attribute value to an RGB value, is also adjusted to the statistics derived from the data that are being rendered. This allows more than one slice to be viewed increasing the ability to understand more complex geology. The application of opacity is not novel; however, a preferred setting of the opacity function is another example of the advantages of the present invention. Commercial products for volume rendering of seismic data using opacity have been available since approximately 1989, but all of these products require the user to manually adjust the color and opacity mappings in order to reveal insights in the data. (Products are available for visualizing medical data that do automatically set these visualization parameters, but these products are not applicable for oil and gas applications.) An advantage of the present inventive method is that it can use the statistics of a given data sets and compare these to a sub region being visualized, and then optimize the rendering parameters to allow the user to more quickly determine if the sub-region being visualized contains any features of interest.

The user can inspect the updated blending image based on the adjusted transformation of FIGS. 11A-11C, as shown in FIG. 12. Subtle geological features such as meandering channels (center of the display) and depositional stratigraphic objects such as channel complexes (lower left of the display) can be readily identified on a 3D visualization system. As shown in this spectrum attribute example, the invention results in default blending parameters that reveal the subtle geological features much more effectively. By producing initial displays which expose more subtle geology in the first rendering, this will facilitate the extraction of insights of the subsurface in a more efficient manner resulting in improved reservoir identification and management and reducing the potential for missed opportunities.

In optional step 16 of FIG. 1, the inventive method may revisit the selection of any or all of the sub-regions, the attributes to be used, the statistics to be extracted, and the comparison algorithms. In final step 17, based on the initial visualization/transformation parameters, the user can inspect the updated seismic data and identify subtle features or objects on a 3D visualization system, or classification methods may be used to further identify and understand features such as channels and salt bodies.

Although 3D seismic data volumes are used in the above process, the proposed method could also be applied to other 3D data sets such as stratigraphic or reservoir models as well as 2D data sets such as horizon and fault surfaces. The proposed method would effectively produce optimal transform and display parameters for visualization and rendering of any geological data objects.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

What is claimed is:

1. A method for determining rendering parameters for visualization and interpretation of all or part of a data volume of seismic or seismic attribute data representing a subsurface region, said method comprising:
   (a) selecting a sub-volume from the data volume, said sub-volume representing a sub-region of the subsurface region;
   (b) selecting an attribute of the seismic data and deriving or computing values of the attribute for both the data volume and the sub-volume;

(c) computing, using a programmed computer, a corresponding statistical distribution of the values for the attribute for both the data volume and the sub-volume;

(d) deriving, using the programmed computer, rendering parameters for the sub-volume by comparing the computed statistical distribution for the sub-volume to that of the data volume, noting at least one difference, and constructing rendering parameters to emphasize the at least one difference, wherein the deriving includes, (i) extracting a normalized trend curve for the data volume, (ii) normalizing the statistical distribution of the values for the attribute of the data volume to the statistical distribution of the values for the attribute for the sub-volume, (iii) determining the at least one difference by subtracting the normalized trend curve from the normalized statistical distribution, which creates a difference curve, and (iv) deriving saturation, as one of the rendering parameters, from the difference curve; and (e) rendering, with the programmed computer, an image or volume of the subsurface region by applying the rendering parameters to the data volume of seismic or seismic attribute data representing the subsurface region.

2. The method of claim 1, further comprising repeating the method for at least one additional sub-volume.

3. The method of claim 1, wherein (b) comprises selecting two or more attributes of the seismic data, and deriving or computing the two or more attributes for both the data volume and the sub-volume, and (c) includes computing the statistical distributions of values for the two or more attributes for the data volume and the sub-volume.

4. The method of claim 3, wherein the two or more attributes are frequency components, obtained by Fourier transforming the seismic data to frequency domain.

5. The method of claim 4, wherein the statistical distribution is an amplitude distribution, and the deriving of rendering parameters comprises assigning a color to each frequency amongst the frequency components and representing the amplitude distribution for each of frequency amongst the frequency components by different shades of the assigned color.

6. The method of claim 5, further comprising producing a color blended image of the data volume or the sub-volume using the rendering parameters, and using color differences to interpret the seismic data.

7. The method of claim 5, wherein negative amplitudes in the amplitude distribution are treated differently from positive amplitudes.

8. The method of claim 5, wherein the different shades of the assigned color that represent the amplitude distribution is nonlinear.

9. The method of claim 3, wherein the rendering parameters comprise assignment of a color, and shadings thereof, to the two or more attributes' statistical distribution.

10. The method of claim 9, wherein the rendering parameters further comprise an opacity setting.

11. The method of claim 1, wherein the normalizing matches peaks of the statistical distributions for the sub-volume and the data volume.

12. The method of claim 1, wherein zero saturation is set to a minimum value of the difference curve and maximum saturation is set at a zero crossing of the difference curve.

* * * * *